Patented Nov. 10, 1931

1,831,025

UNITED STATES PATENT OFFICE

WILHELM MICHAEL AND WALTER HAAG, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF ESTERS OF α-HYDROXY CARBOXYLIC ACIDS

No Drawing. Application filed June 26, 1929, Serial No. 373,935, and in Germany July 5, 1928.

The present invention relates to the production of esters of alpha-hydroxy carboxylic acids.

In the application for U. S. A. patent Serial No. 300,379 filed August 17, 1928 we have described a process for the production of alpha-hydroxy carboxylic acids from their nitriles by which the saponification of the nitriles is carried out with acids in the presence of an inert solvent which is capable of dissolving the reacting substances and the reaction products with the exception of the resulting ammonium salt, an amount of water sufficient for the saponification being added, or by preparing already the nitriles from organic carbonyl compounds, i. e. from aldehydes, or ketones, and hydrocyanic acid in the presence of a solvent of the aforesaid nature and then saponifying the nitriles in the aforesaid manner.

We have now found that esters of the alpha-hydroxy carboxylic acids are obtained with particular advantage by carrying out the preparation of the nitriles and the conversion of the same into esters preferably in one operation in an inert solvent which is capable of dissolving the reacting components and the reaction products with the exception of the resulting ammonium salt. Suitable solvents for this purpose are for example dioxane, tetrachlorethane, ethyl ether, chloroform, hexahydrobenzene and the like and also mixtures of these substances.

The process in accordance with the present invention may be carried out for example as follows:—Liquid or gaseous hydrocyanic acid is introduced at a moderately elevated temperature into a mixture consisting of the inert solvent, the required aldehyde or ketone, the alcohol required for esterifying and a small quantity of alkali as a catalyst, and in this manner the corresponding alpha-hydroxy carboxylic acid nitrile is obtained. Gaseous hydrochloric acid is then passed in and the theoretical quantity of water necessary for the formation of the ester is added. The nitrile is thus converted directly into the ester of the alpha-hydroxy carboxylic acid corresponding thereto, with the omission of the intermediate formation of the free acid. The ester, which is obtained in an excellent yield, can be easily isolated, for example by distillation. The alcohol necessary for the esterification can if desired be added after the formation of the nitrile instead of beforehand. Similarly the hydrocyanic acid can be added to the mixture of inert solvent and alcohol and the aldehyde or ketone then added.

In accordance with the present invention it is possible easily to prepare esters of viscous initial substances, such as alcohols of a high molecular weight and to convert also highly viscous aldehydes and ketones into esters of the corresponding hydroxy carboxylic acids, which esters can be prepared otherwise only with difficulty.

The following examples will further illustrate the nature of the said invention but the invention is not restricted to these examples.

Example 1

27 kilograms of liquid or gaseous hydrocyanic acid are gradually introduced into a mixture of 100 litres of dioxane, 67 litres of 90 per cent acetaldehyde and 12 litres of decinormal caustic soda solution in a reaction vessel fitted with an ice-cooled reflux condenser. The reaction mixture becomes heated to from 70° to 80° centigrade with the formation of lactic acid nitrile and is kept at this temperature until the end of the reaction. 120 kilograms of cyclohexanol are then added and gaseous hydrochloric acid is passed in, preferably while cooling. The water necessary for the formation of the ester is already present in the caustic soda solution and in the acetaldehyde. The reaction mixture is heated to boiling and esterification occurs. The ammonium chloride which separates out is filtered off and washed with a little dioxane. If the esterification should not be complete more hydrochloric acid is passed into the filtrate while heating the same to boiling. Any hydrochloric acid present in the mixture can be removed by passing in a current of dry gaseous ammonia. Any further ammonium chloride produced is then filtered off and the filtrate distilled, and cyclohexanol lactate, boiling at from 95° to 110° centigrade at 7 millimetres (mercury gauge) is obtained. The yield amounts to about 165 kilograms which is equivalent to 96 per cent of the theoretical yield.

Example 2

In a manner analogous to that described in Example 1, $\alpha.\gamma.$-dihydroxy valeric acid chlor ethyl ester is obtained from aldol, hydrocyanic acid and ethylene chlorhydrin in the presence of chloroform as the inert solvent. The ester boils between 120° and 135° centigrade at 10 millimetres (mercury gauge) and about 84 per cent of the theoretical yield is obtained.

Example 3

Cyclohexanone and hydrocyanic acid are condensed as described in Example 1 in molecular proportions; and dissolved in dioxane and the cyanhydrin formed is converted into cyclohexanol-1-carboxylic acid chlor ethyl ester as described above with ethylene chlorhydrin. This ester boils at 134° centigrade at 6 millimetres (mercury gauge) and about 90 per cent of the theoretical yield is obtained.

We claim:

1. The process for the production of esters of alpha-hydroxy carboxylic acids which comprises acting with hydrocyanic acid on an organic carbonyl compound in the presence of an inert organic solvent capable of dissolving the reacting components and the reaction products, but not the resulting ammonium salt, adding, at any stage, an alcohol in a quantity required for the formation of the desired ester and introducing the quantity of water required for the esterification and a strong inorganic acid.

2. The process for the production of esters of alpha-hydroxy carboxylic acids which comprises acting with hydrocyanic acid on an organic carbonyl compound in the presence of an inert organic solvent capable of dissolving the reacting components and the reaction products, but not the resulting ammonium salt, adding an alcohol in a quantity required for the formation of the desired ester and introducing the quantity of water required for the esterification and a strong inorganic acid.

3. The process for the production of esters of alpha-hydroxy carboxylic acids which comprises acting with hydrocyanic acid on an organic carbonyl compound in the presence of an inert organic solvent capable of dissolving the reacting components and the reaction products, but not the resulting ammonium salt, and of an alcohol in a quantity required for the formation of the desired ester and introducing the quantity of water required for the esterification and a strong inorganic acid.

4. The process for the production of esters of alpha-hydroxy carboxylic acids which comprises acting with hydrocyanic acid on an organic carbonyl compound in the presence of an inert organic solvent capable of dissolving the reacting components and the reaction products, but not the resulting ammonium salt, and of a small quantity of an alkaline agent, adding an alcohol in a quantity required for the formation of the desired ester and introducing the quantity of water required for the esterification and a strong inorganic acid.

5. The process for the production of esters of alpha-hydroxy carboxylic acids which comprises acting with hydrocyanic acid on an organic carbonyl compound in the presence of an inert organic solvent capable of dissolving the reacting components and the reaction products, but not the resulting ammonium salt, of a small quantity of an alkaline agent, and of an alcohol in a quantity required for the formation of the desired ester, and introducing the quantity of water required for the esterification and a strong inorganic acid.

6. The process for the production of esters of alpha-hydroxy carboxylic acids which comprises acting with hydrocyanic acid on an organic carbonyl compound in the presence of dioxane, adding, at any stage, an alcohol in a quantity required for the formation of the desired ester and introducing the quantity of water required for the esterification and a strong inorganic acid.

7. The process for the production of esters of alpha-hydroxy carboxylic acids which comprises acting with hydrocyanic acid on an organic carbonyl compound in the presence of dioxane, of a small quantity of an alkaline agent, and of an alcohol in a quantity required for the formation of the desired ester, and introducing the quantity of water required for the esterification and a strong inorganic acid.

In testimony whereof we have hereunto set our hands.

WILHELM MICHAEL.
WALTER HAAG.